US012793990B2

(12) United States Patent
Saito et al.

(10) Patent No.: US 12,793,990 B2
(45) Date of Patent: Nov. 10, 2026

(54) LITHIUM PRIMARY BATTERY, AND NON-AQUEOUS ELECTROLYTE SOLUTION FOR LITHIUM PRIMARY BATTERY

(71) Applicant: Panasonic Intellectual Property Management Co., Ltd., Osaka (JP)

(72) Inventors: Kohei Saito, Osaka Fu (JP); Takayuki Nakatsutsumi, Osaka Fu (JP); Atsushi Fukui, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 817 days.

(21) Appl. No.: 17/793,549

(22) PCT Filed: Oct. 15, 2020

(86) PCT No.: PCT/JP2020/038921

§ 371 (c)(1),
(2) Date: Jul. 18, 2022

(87) PCT Pub. No.: WO2021/149310

PCT Pub. Date: Jul. 29, 2021

(65) Prior Publication Data

US 2023/0111757 A1 Apr. 13, 2023

(30) Foreign Application Priority Data

Jan. 20, 2020 (JP) ................................ 2020-007064

(51) Int. Cl.

| | |
|---|---|
| ***H01M 6/16*** | (2006.01) |
| ***H01M 4/06*** | (2006.01) |
| ***H01M 4/38*** | (2006.01) |
| ***H01M 4/505*** | (2010.01) |
| ***H01M 6/14*** | (2006.01) |

(52) U.S. Cl.

CPC ............ *H01M 6/168* (2013.01); *H01M 4/06* (2013.01); *H01M 4/382* (2013.01); *H01M 4/505* (2013.01); *H01M 6/14* (2013.01); *H01M 6/166* (2013.01)

(58) Field of Classification Search

CPC ........ H01M 6/168; H01M 6/166; H01M 6/14; H01M 4/06; H01M 4/382; H01M 4/405; H01M 4/134; H01M 4/505; H01M 2004/028; H01M 10/0567; H01M 10/0568

See application file for complete search history.

(56) References Cited

U.S. PATENT DOCUMENTS

| | | | | |
|---|---|---|---|---|
| 6,641,957 | B1 | 11/2003 | Kawaguchi et al. | |
| 2002/0081496 | A1 | 6/2002 | Tsujioka et al. | |
| 2008/0193854 | A1 | 8/2008 | Yamaguchi et al. | |
| 2014/0193706 | A1 | 7/2014 | Morinaka et al. | |
| 2016/0248121 | A1 | 8/2016 | Uematsu et al. | |
| 2017/0358791 | A1* | 12/2017 | Sugioka ................ | H01M 6/168 |
| 2018/0309139 | A1 | 10/2018 | Sugioka et al. | |
| 2021/0104725 | A1 | 4/2021 | Nakai et al. | |

FOREIGN PATENT DOCUMENTS

| | | | |
|---|---|---|---|
| JP | 61-281466 | A | 12/1986 |
| JP | 2000-294231 | A | 10/2000 |
| JP | 2000-294273 | * | 10/2000 |
| JP | 2002-110235 | A | 4/2002 |
| JP | 2006-236889 | A | 9/2006 |
| JP | 2007-123097 | A | 5/2007 |
| JP | 2007-257961 | A | 10/2007 |
| JP | 2009-123549 | A | 6/2009 |
| JP | 2012-190669 | * | 10/2012 |
| JP | 2013-016347 | A | 1/2013 |
| JP | 2013-51122 | A | 3/2013 |
| JP | 2015-22985 | A | 2/2015 |
| JP | 2015-149140 | * | 8/2015 |
| JP | 2016-189327 | A | 11/2016 |
| JP | 2018-170276 | * | 11/2018 |
| WO | 01/41247 | A1 | 6/2001 |
| WO | WO 01/41247 | * | 6/2001 |
| WO | 2017/169684 | A1 | 10/2017 |
| WO | 2018/179935 | A1 | 10/2018 |
| WO | 2020/012718 | A1 | 1/2020 |
| WO | WO 2020/026525 | * | 2/2020 |

OTHER PUBLICATIONS

International Search Report dated Dec. 22, 2020, issued in counterpart International Application No. PCT/JP2020/038921, with English Translation (6 pages).
Office Action dated Oct. 25, 2024, issued in counterpart CN application No. 202080091617.2, with Partial English translation. (13 pages).

* cited by examiner

*Primary Examiner* — Laura Weiner
(74) *Attorney, Agent, or Firm* — WHDA, LLP

(57) ABSTRACT

A lithium primary battery includes a positive electrode, a negative electrode, and a non-aqueous electrolyte. The positive electrode contains a positive electrode material mixture including $Li_xMnO_2$ where $0 \leq x \leq 0.05$. The negative electrode contains at least one of metal lithium and a lithium alloy. The non-aqueous electrolyte contains an oxalate borate complex component and a cyclic imide component. In the non-aqueous electrolyte, the concentration of the oxalate borate complex component is 5.5 mass % or less, and the concentration of the cyclic imide component is 1 mass % or less. The mass ratio of the cyclic imide component to the oxalate borate complex component contained in the non-aqueous electrolyte is 0.02 or more and 10 or less.

8 Claims, 1 Drawing Sheet

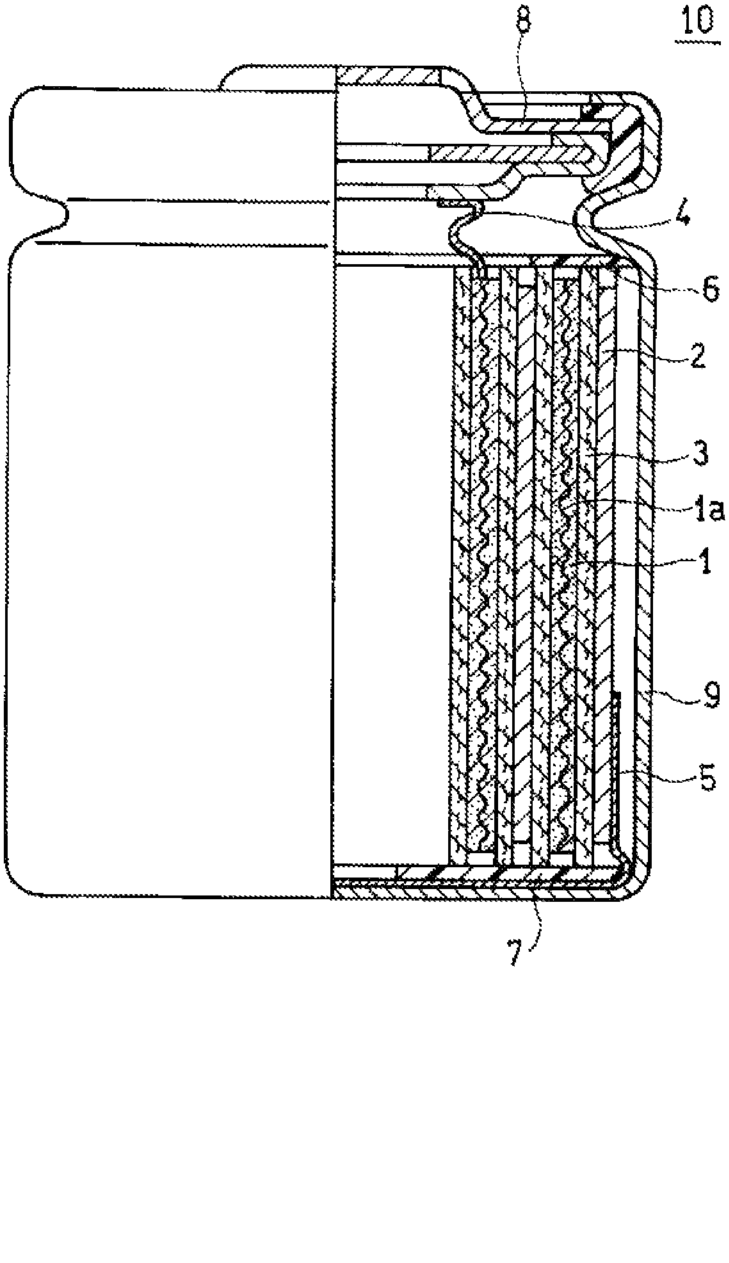
8
10
4
6
2
3
1a
1
9
5
7

LITHIUM PRIMARY BATTERY, AND NON-AQUEOUS ELECTROLYTE SOLUTION FOR LITHIUM PRIMARY BATTERY

TECHNICAL FIELD

The present disclosure relates to a non-aqueous electrolyte for a lithium primary battery, and a lithium primary battery including the non-aqueous electrolyte.

BACKGROUND ART

Lithium primary batteries have high energy density and low self-discharge, and are therefore used in many electronic devices. A lithium primary battery includes a negative electrode containing metal lithium, a positive electrode, and a non-aqueous electrolyte. In the positive electrode, graphite fluoride, manganese dioxide, thionyl chloride or the like is included as an active material.

In a lithium primary battery, as the discharge proceeds, the internal resistance increases to reduce the discharge capacity, in some cases. In view of suppressing such an increase in internal resistance, it has been proposed to use an additive in the electrolyte.

For example, Patent Literature 1 proposes a non-aqueous organic electrolyte for a lithium primary battery including manganese dioxide as a positive electrode active material, and lithium metal or a lithium alloy as a negative electrode active material. The non-aqueous organic electrolyte contains $LiCF_3SO_3$ as a supporting salt, and $LiB(C_2O_4)_2$ added thereto. Patent Literature 2 proposes a non-aqueous electrolyte containing an additive, such as phthalimide, in view of suppressing an increase in the internal resistance of a primary or secondary battery and improving the charge and discharge cycle characteristics of the secondary battery.

As an electrolyte for an electrochemical device excellent in heat resistance and hydrolysis resistance, Patent Literature 3 proposes an electrolyte containing $LiB(C_2O_4)F_2$ and the like.

Patent Literature 4 proposes an additive composition for an electrolyte for a non-aqueous power storage device, including an additive consisting of a compound (A) in which at least one of acidic protons of a specific acid is substituted by a silyl group having three hydrocarbon groups. Patent Literature 4 teaches that the additive suppresses gas generation in a lithium ion secondary battery during use, so as not to cause swelling of the battery.

CITATION LIST

Patent Literature

[PTL 1] Japanese Laid-Open Patent Publication No. 2015-22985

[PTL 2] International Publication WO 01/41247

[PTL 3] Japanese Laid-Open Patent Publication No. 2002-110235

[PTL 4] Japanese Laid-Open Patent Publication No. 2016-189327

SUMMARY OF INVENTION

In a lithium primary battery, a component of the electrolyte, such as a non-aqueous solvent, decomposes during storage of the battery, and gas generation becomes remarkable in some cases. When the gas generation becomes remarkable, the internal pressure of the battery increases, which may cause swelling of the battery or leakage of the electrolyte.

Patent Literature 1 proposes a non-aqueous electrolyte containing lithium bis(oxalate)borate ($LiB(C_2O_4)_2$(LiBOB)). However, when such a non-aqueous electrolyte containing an oxalate borate complex component is used in a lithium primary battery including a positive electrode containing manganese dioxide and a negative electrode containing lithium metal or a lithium alloy, the oxalate borate complex component decomposes during storage of the battery and generates gas in some cases.

A first aspect of the present disclosure relates to a lithium primary battery, including: a positive electrode; a negative electrode; and a non-aqueous electrolyte, wherein

- the positive electrode contains a positive electrode material mixture including $Li_xMnO_2$ where $0 \le x \le 0.05$,
- the negative electrode contains at least one of metal lithium and a lithium alloy,
- the non-aqueous electrolyte contains an oxalate borate complex component and a cyclic imide component,
- a concentration of the oxalate borate complex component in the non-aqueous electrolyte is 5.5 mass % or less,
- a concentration of the cyclic imide component in the non-aqueous electrolyte is 1 mass % or less, and
- a mass ratio of the cyclic imide component to the oxalate borate complex component contained in the non-aqueous electrolyte is 0.02 or more and 10 or less.

A second aspect of the present disclosure relates to a lithium primary battery, including: a positive electrode; a negative electrode; and a non-aqueous electrolyte, wherein

- the positive electrode contains a positive electrode material mixture including $Li_xMnO_2$ where $0 \le x \le 0.05$,
- the negative electrode contains at least one of metal lithium and a lithium alloy,
- the non-aqueous electrolyte contains an oxalate borate complex component and a cyclic imide component,
- a concentration of the oxalate borate complex component in the non-aqueous electrolyte is 0.1 mass % or more and 5.5 mass % or less, and
- a concentration of the cyclic imide component in the non-aqueous electrolyte is 0.1 mass % or more and 1 mass % or less.

A third aspect of the present disclosure relates to a non-aqueous electrolyte for a lithium primary battery including a positive electrode containing a positive electrode material mixture including $Li_xMnO_2$ where $0 \le x \le 0.05$, a negative electrode containing at least one of metal lithium and a lithium alloy, and a non-aqueous electrolyte, wherein

- the non-aqueous electrolyte contains an oxalate borate complex component and a cyclic imide component,
- a concentration of the oxalate borate complex component in the non-aqueous electrolyte is 0.1 mass % or more and 5.5 mass % or less, and
- a concentration of the cyclic imide component in the non-aqueous electrolyte is 0.1 mass % or more and 1 mass % or less.

With the lithium primary battery and the non-aqueous electrolyte for a lithium primary battery according to the present disclosure, it is possible to suppress the gas generation during storage of the lithium primary battery, and suppress the reduction in capacity.

BRIEF DESCRIPTION OF DRAWING

FIG. 1 A front view, partially in section, of a lithium primary battery according to an embodiment of the present disclosure.

DESCRIPTION OF EMBODIMENTS

In a lithium primary battery including a positive electrode containing $Li_xMnO_2$ ($0 \le x \le 0.05$) and a negative electrode containing at least one of metal lithium and a lithium alloy, when using a non-aqueous electrolyte that contains an oxalate borate complex component, as compared to when using a non-aqueous electrolyte that does not contain an oxalate borate complex component, the reduction in capacity during storage of the battery can be suppressed to some extent, but the amount of gas generated increases. From such an increase in the amount of gas generated, it can be inferred that in the lithium primary battery including the positive electrode and the negative electrode as above, the oxalate borate complex component decomposes and generates gas, during storage of the battery. Such gas generation is remarkable especially when the battery is stored at high temperatures.

On the other hand, in a lithium primary battery, a surface film derived from a component contained in the electrolyte is formed in some cases on a surface of the positive electrode. The surface film inhibits the decomposition of the electrolyte at the surface of the positive electrode, and the gas generation is reduced. However, when the surface of the positive electrode is covered with a dense surface film, the side reaction accompanying the decomposition of the electrolyte is inhibited, but on the other hand, the capacity is reduced due to the low lithium ion conductivity of the surface film. During storage of the battery, the surface film tends to grow. Therefore, suppressing the reduction in capacity after storage of the battery is in a trade-off relationship with suppressing the gas generation, and achieving both is difficult. The growth of the surface film is remarkable especially when the battery is stored at high temperatures.

A lithium primary battery according to the present disclosure includes a positive electrode containing a positive electrode material mixture including $Li_xMnO_2$ ($0 \le x \le 0.05$), a negative electrode containing at least one of metal lithium and a lithium alloy, and a non-aqueous electrolyte. The non-aqueous electrolyte contains an oxalate borate complex component and a cyclic imide component. In such a lithium primary battery, the non-aqueous electrolyte satisfies at least one of the following conditions (a) and (b).

(a) The concentration of the oxalate borate complex component in the non-aqueous electrolyte is 5.5 mass % or less, and the concentration of the cyclic imide component in the non-aqueous electrolyte is 1 mass % or less, and the mass ratio of the cyclic imide component to the oxalate borate complex component contained in the non-aqueous electrolyte is 0.02 or more and 10 or less.

(b) The concentration of the oxalate borate complex component in the non-aqueous electrolyte is 0.1 mass % or more and 5.5 mass % or less, and the concentration of the cyclic imide component in the non-aqueous electrolyte is 0.1 mass % or more and 1 mass % or less.

According to the present disclosure, in which the lithium primary battery includes the non-aqueous electrolyte as described above, the gas generation during storage of the battery can be suppressed despite the inclusion of an oxalate borate complex component in the non-aqueous electrolyte. In addition, the reduction in capacity after storage of the lithium primary battery can be suppressed. Especially even when the lithium primary battery is stored at high temperatures, the gas generation can be suppressed and the reduction in capacity can be suppressed. Such effects can be obtained in the present disclosure presumably for the following reasons.

In a lithium primary battery including the above positive electrode, the above negative electrode, and a non-aqueous electrolyte, when the non-aqueous electrolyte does not contain an oxalate borate complex component and contains a cyclic imide component, as compared to when neither an oxalate borate complex component nor a cyclic imide component is contained, the amount of gas generated decreases, but on the other hand, the capacity after storage reduces significantly. When a dense surface film containing a component derived from the cyclic imide component is formed on the surface of the positive electrode, the contact between the electrolyte solvent and the positive electrode is suppressed, and the gas generation due to the decomposition of the solvent is suppressed. However, the lithium ion conductivity of the aforementioned surface film is low, and the discharge reaction is inhibited, leading to a reduction in discharge capacity.

When the non-aqueous electrolyte does not contain a cyclic imide component and contains an oxalate borate complex component, as compared to when neither an oxalate borate complex component nor a cyclic imide component is contained, the reduction in capacity after storage is suppressed to some extent, but the amount of gas generated increases. The increase in the amount of gas generated is presumably attributed to that the oxalate borate complex component decomposes at the surface of the positive electrode and generates gas, as described above.

In contrast, in the lithium primary battery of the present disclosure, despite the inclusion of an oxalate borate complex component in the non-aqueous electrolyte, the gas generation is considerably suppressed, as compared to when neither an oxalate borate complex component nor a cyclic imide component is contained. In addition, the reduction in capacity after storage can be significantly suppressed, as compared to when the non-aqueous electrolyte does not contain a cyclic imide component and contains an oxalate borate complex component. In the lithium primary battery of the present disclosure, the reduction in capacity after storage is significantly suppressed more than predicted from when the non-aqueous electrolyte contains either an oxalate borate complex component or a cyclic imide component. Therefore, when the non-aqueous electrolyte satisfies at least one of the above conditions (a) and (b), it can be said that, in suppressing the reduction in capacity after storage, the synergistic effect of the oxalate borate complex component and the cyclic imide component can be obtained. Although not necessarily clear, the factors why the reduction in capacity after storage is significantly suppressed while the gas generation is considerably suppressed as described above in the lithium primary battery of the present disclosure can be considered as follows. When the cyclic imide is decomposed at the surface of the positive electrode to form a surface film, the oxalate borate complex component is also involved in the decomposition reaction, to form a surface film containing components derived from both the oxalate borate complex component and the cyclic imide component. Such a surface film, unlike a surface film composed only of the cyclic imide component, can maintain its high lithium ion conductivity and suppress the contact between the solvent and the positive electrode. This, as a result, can suppress the increase of the side reaction accompanying gas generation, while suppressing the reduction in capacity.

The present disclosure also encompasses a non-aqueous electrolyte for a lithium primary battery including a positive electrode containing a positive electrode material mixture including $Li_xMnO_2$ ($0 \leq x \leq 0.05$), a negative electrode containing at least one of metal lithium and a lithium alloy, and a non-aqueous electrolyte. The non-aqueous electrolyte contains an oxalate borate complex component and a cyclic imide component. The non-aqueous electrolyte satisfies the above condition (b). Further, the present disclosure also encompasses the use of such a non-aqueous electrolyte in a lithium primary battery including a positive electrode containing a positive electrode material mixture including $Li_xMnO_2$ ($0 \leq x \leq 0.05$), a negative electrode containing at least one of metal lithium and a lithium alloy, and a non-aqueous electrolyte.

In the following, the lithium primary battery and the non-aqueous electrolyte of the present disclosure, and a method for producing the lithium primary battery will be more specifically described.

[Lithium Primary Battery]

(Positive Electrode)

The positive electrode contains a positive electrode material mixture. The positive electrode material mixture contains a positive electrode active material. As the positive electrode active material contained in the positive electrode, manganese dioxide is exemplified. The positive electrode containing manganese dioxide develops a relatively high voltage and is excellent in pulse discharge characteristics. The manganese dioxide may be in a mixed crystal state including two or more crystal states. The positive electrode may contain a manganese oxide other than manganese dioxide. Examples of the manganese oxide other than manganese dioxide include MnO, $Mn_3O_4$, $Mn_2O_3$, and $Mn_2O_7$. It is preferable that the main component of the manganese oxide contained in the positive electrode is manganese dioxide.

The manganese dioxide contained in the positive electrode may be partially doped with lithium. When the amount of doped lithium is small, a high capacity can be ensured. The manganese dioxide and the manganese dioxide doped with a small amount of lithium can be represented by $Li_xMnO_2$ (where $0 \leq x \leq 0.05$). Here, the average composition of the whole manganese oxide contained in the positive electrode is represented by $Li_xMnO_2$ (where $0 \leq x \leq 0.05$). The ratio x of Li is 0.05 or less when the lithium primary battery is in the early stage of discharge. The ratio x of Li typically increases as the discharge of the lithium primary battery proceeds. The oxidation number of the manganese contained in manganese dioxide is theoretically tetravalent. However, when another manganese oxide is included in the positive electrode or the manganese dioxide is doped with lithium, the oxidation number of the manganese sometimes slightly increases or decreases from the tetravalent value. Therefore, a slight increase or decrease of the average oxidation number of the manganese from the tetravalent value is permissible in $Li_xMnO_2$.

The positive electrode can contain, in addition to $Li_xMnO_2$, another positive electrode active material as used in a lithium primary battery. Examples of the other positive electrode active material include graphite fluoride. In view of allowing the effect of using the non-aqueous electrolyte satisfying the above conditions (a) or (b) to be easily exerted, the proportion of $Li_xMnO_2$ occupying the whole positive electrode active material is preferably 90 mass % or more.

As the manganese dioxide, an electrolytic manganese dioxide is preferably used. An electrolytic manganese dioxide having been subjected to at least one of neutralization treatment, cleaning treatment, and baking treatment, as needed, may be used.

The electrolytic manganese dioxide is typically obtained through electrolysis of an aqueous solution of manganese sulfate. Therefore, sulfate ions are inevitably contained in the electrolytic manganese dioxide. In a positive electrode material mixture prepared using such an electrolytic manganese dioxide, sulfur atoms are inevitably contained. The amount of sulfur atoms contained in the positive electrode material mixture may be 0.05 parts by mass or more and 3 parts by mass or less, relative to 100 parts by mass of manganese atoms contained in the positive electrode material mixture. When the amount of sulfur atoms is in such a range, in the lithium primary battery, the sulfate ions interact with the unstable $Mn^{3+}$ produced in association with the intercalation of lithium into $Li_xMnO_2$, to suppress the production of $Mn^{2+}$ resulted from disproportionation of $Mn^{3+}$. This can suppress the leaching of $Mn^{2+}$ into the non-aqueous electrolyte and the deposition of Mn at the negative electrode. As a result, it is possible to ensure a high reliability of the lithium primary battery while ensuring a high capacity. On the other hand, in a lithium secondary battery, in which the sulfate ions are partially decomposed in the process of charging, it is difficult to sufficiently ensure the effects as above even though a sulfate is included in such an amount that the sulfur atoms are contained in the above range in the positive electrode material mixture. The proportion of the sulfur atoms in the positive electrode material mixture can be adjusted by adjusting the conditions for the cleaning treatment and the neutralization treatment. The cleaning treatment may be, for example, at least one of washing with water and cleaning with acid. As the neutralizing agent used for the neutralization treatment, for example, an inorganic base, such as ammonia and hydroxide can be used.

By adjusting the conditions at the time of electrolytic synthesis, the crystallinity of the manganese dioxide can be increased, and an electrolytic manganese dioxide with small specific surface area can be obtained. The BET specific surface area of $Li_xMnO_2$ may be 20 $m^2/g$ or more and 50 $m^2/g$ or less. When the BET specific surface area of $Li_xMnO_2$ is in the range above, a positive electrode material mixture layer can be easily formed while the gas generation can be more effectively suppressed in the lithium primary battery.

The BET specific surface area of $Li_xMnO_2$ can be measured by a known method, and is measured, for example, using a specific surface area meter (e.g., available from Mountech Co., Ltd.), based on the BET method. For example, the $Li_xMnO_2$ separated from the positive electrode taken out from the battery is used as a measurement sample.

The median particle diameter of $Li_xMnO_2$ may be 10 μm or more and 40 μm or less. When the median particle diameter is in the range above, the gas generation can be more effectively suppressed in the lithium primary battery, and excellent current collecting performance at the positive electrode can be easily ensured.

The median particle diameter of $Li_xMnO_2$ is, for example, a median of the particle size distribution obtained by a quantitative laser diffraction scattering method (qLD method). For example, the $Li_xMnO_2$ separated from the positive electrode taken out from the battery is used as a measurement sample. For the measurement, for example, SALD-7500 nano available from Shimadzu Corporation can be used.

The positive electrode material mixture can contain a binder, in addition to the positive electrode active material. The positive electrode material mixture may contain an electrically conductive agent.

Examples of the binder include fluorocarbon resin, rubber particles, and acrylic resin.

Examples of the conductive agent include a conductive carbon material. Examples of the conductive carbon material include natural graphite, artificial graphite, carbon black, and carbon fibers.

The positive electrode can further include a positive electrode current collector which holds the positive electrode material mixture. As the material of the positive electrode current collector, stainless steel, aluminum, titanium, and the like are exemplified.

When the battery is of a coin type, the positive electrode may be constituted by attaching a pellet of positive electrode material mixture to a ring-like positive electrode current collector having an L-shaped cross section, or may be constituted of a pellet of positive electrode material mixture only. The pellet of positive electrode material mixture can be obtained by, for example, compression-molding a wet-state positive electrode material mixture prepared by adding an appropriate amount of water to the positive electrode active material and the additive, followed by drying.

When the battery is of a cylindrical type, a positive electrode including a sheet-like positive electrode current collector, and a positive electrode material mixture layer held on the positive electrode current collector can be used. For the sheet-like positive electrode current collector, for example, an expanded metal, a net, a punched metal, or the like can be used. The positive electrode material mixture layer can be obtained by, for example, applying the above-mentioned wet-state positive electrode material mixture to a surface of the sheet-like positive electrode current collector, applying a pressure thereto in the thickness direction, followed by drying.

(Negative Electrode)

The negative electrode may contain metal lithium or a lithium alloy, and may contain both metal lithium and a lithium alloy. For example, a composite containing metal lithium and a lithium alloy may be used for the negative electrode.

Examples of the lithium alloy include Li—Al alloy, Li—Sn alloy, Li—Ni—Si alloy, and Li—Pb alloy. The content of the metal element other than lithium in the lithium alloy is preferably 0.05 to 15 mass %, in view of ensuring the discharge capacity and stabilizing the internal resistance.

The metal lithium, the lithium alloy, or a composite of these are formed into a desired shape and thickness, according to the type, size, specified performance, and the like of the lithium primary battery.

When the battery is of a coin type, a hoop-like metal lithium, lithium alloy, or composite of these punched into a disc shape may be used as the negative electrode. When the battery is of a cylindrical type, a sheet of metal lithium, a lithium alloy, or a composite of these may be used as the negative electrode. The sheet can be obtained by, for example, extrusion molding. Specifically, in a cylindrical-type battery, a metal lithium or metal alloy foil or the like having a shape having a longitudinal direction and a lateral direction is used.

When the battery is of a cylindrical type, a continuous tape including a resin base material and an adhesive layer may be attached on at least one principal surface of the negative electrode along the longitudinal direction. The principal surface means a surface facing the positive electrode. The width of the tape is set to, for example, 0.5 mm or more and 3 mm or less. The tape serves to prevent an occurrence of a failure in current collection due to a foil breakage in the negative electrode which may occur at the final stage of discharge when the lithium component in the negative electrode is consumed by the reaction. The occurrence of a failure in current collection leads to a reduction in battery capacity. The adhesive strength of the tape, however, is reduced due to the electrolyte, during a long-term storage. With an electrolyte containing an oxalate borate complex component and a cyclic imide component, the reduction in adhesive strength can be suppressed, and the occurrence of a failure in current collection due to a foil breakage in the negative electrode can be more effectively prevented.

As the material of the resin base material, for example, fluorocarbon resin, polyimide, polyphenylene sulfide, polyethersulfone, polyolefin such as polyethylene and polypropylene, polyethylene terephthalate, and the like can be used. Preferred is a polyolefin, and more preferred is polypropylene.

The adhesive layer contains, for example, at least one component selected from the group consisting of a rubber component, a silicone component, and an acrylic resin component. Specifically, as the rubber component, a synthetic rubber, a natural rubber, and the like can be used. Examples of the synthetic rubber include butyl rubber, butadiene rubber, styrene-butadiene rubber, isoprene rubber, neoprene, polyisobutylene, acrylonitrile-butadiene rubber, styrene-isoprene block copolymer, styrene-butadiene block copolymer, and styrene-ethylene-butadiene block copolymer. As the silicone component, an organic compound having a polysiloxane structure, a silicone-series polymer, and the like can be used. Examples of the silicone-series polymer include a peroxide curing type silicone, and an addition reaction type silicone. As the acrylic resin component, a polymer having an acrylic monomer unit, such as acrylic acid, methacrylic acid, acrylic acid ester, and methacrylic acid ester can be used, examples of which include a homopolymer or a copolymer of acrylic monomers, such as acrylic acid, methacrylic acid, methyl acrylate, methyl methacrylate, ethyl acrylate, ethyl methacrylate, propyl acrylate, propyl methacrylate, butyl acrylate, butyl methacrylate, octyl acrylate, octyl methacrylate, 2-ethyl hexyl acrylate, and 2-ethylhexyl methacrylate. The adhesive layer may contain a crosslinking agent, a plasticizer, a tackifier, and the like.

(Non-Aqueous Electrolyte)

The non-aqueous electrolyte contains, for example, an oxalate borate complex component and a cyclic imide component, and a non-aqueous solvent dissolving them. The non-aqueous electrolyte contains, a lithium salt or lithium ions. At least one of the oxalate borate complex component and the cyclic imide component may be a lithium salt, and may be capable of producing lithium ions. The non-aqueous electrolyte may contain a lithium salt other than the oxalate borate complex component and the cyclic imide component.

(Oxalate Borate Complex Component)

The oxalate borate complex component has a structure represented by at least the following formula (1). The non-aqueous electrolyte may contain one kind or two or more kinds of oxalate borate acid complex components.

[Chem. 1]

(1)

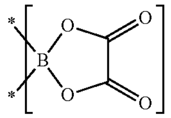

(In the formula, * indicates a bonding hand.)

(In the formula, * indicates a bonding hand.)

The oxalate borate complex component may be contained in the non-aqueous electrolyte in the form of either an acid (or anion) or a salt. The oxalate borate complex component is capable of producing at least an oxalate borate complex anion in the non-aqueous electrolyte. The oxalate borate complex component may be a salt of the oxalate borate complex anion and a cation contained in the non-aqueous electrolyte.

In the oxalate borate complex component, at least one oxalate ligand is coordinated to one boron atom. Two oxalate ligands may be coordinated to one boron atom. The oxalate borate complex component may have a structure in which one oxalate ligand and two halogen atoms are coordinated to one boron atom. The oxalate borate complex component having such a structure is capable of producing an anion represented by the following formula (2).

[Chem. 2]

(2)

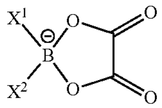

$X^1$ and $X^2$ independently represent a halogen atom. Examples of the halogen atom coordinated to the boron atom include a fluorine atom and a chlorine atom.

As the oxalate borate complex component, a bis(oxalate) borate complex component and a difluoro(oxalate)borate complex component are preferably used. In particular, lithium bis(oxalate)borate and lithium difluoro(oxalate)borate are preferable as the oxalate borate complex component. The bis(oxalate)borate complex component has a structure in which two oxalate ligands are coordinated to one boron atom. The oxalate borate complex component having such a structure is capable of producing an anion represented by the following formula (3). The difluoro(oxalate)borate complex component has a structure in which one oxalate ligand and two fluorine atoms are coordinated to one boron atom.

[Chem. 3]

(3)

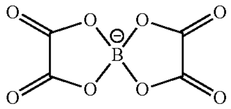

When the non-aqueous electrolyte satisfies the above condition (a), the concentration of the oxalate borate complex component in the non-aqueous electrolyte is 5.5 mass % or less, and may be 5 mass % or less. When the concentration of the oxalate borate complex component exceeds 5.5 mass %, gas generation during storage becomes remarkable. The concentration of the oxalate borate complex component in the non-aqueous electrolyte may be any value equal to or higher than the detection limit, and is, for example, 0.1 mass % or more and may be 0.5 mass % or more. These upper limit and lower limit values may be combined in any combination.

During storage or discharge of the lithium primary battery, the oxalate borate complex component is consumed for the surface film formation and the like in the lithium primary battery, and the concentration of the oxalate borate complex component in the non-aqueous electrolyte fluctuates. The concentration of the oxalate borate complex component in the non-aqueous electrolyte used for fabrication or manufacturing of the lithium primary battery is preferably set to 0.1 mass % or more, more preferably 0.5 mass % or more. In this case, the reduction in capacity after storage of the lithium primary battery can be significantly suppressed. The concentration of the oxalate borate complex component in the non-aqueous electrolyte used for fabrication or manufacturing of the lithium primary battery is preferably set to 5.5 mass % or less, more preferably 5 mass % or less. In this case, the gas generation during storage of the lithium primary battery can be effectively suppressed. These upper limit and lower limit values may be combined in any combination.

When the non-aqueous electrolyte satisfies the above condition (b), the concentration of the oxalate borate complex component in the non-aqueous electrolyte is 0.1 mass % or more and 5.5 mass % or less, and may be 0.1 mass % or more and 5 mass % or less, 0.5 mass % or more and 5.5 mass % or less, or 0.5 mass % or more and 5 mass % or less. When the concentration of the oxalate borate complex component is in the range above, it is possible to significantly suppress the reduction in capacity after storage, while suppressing the gas generation during storage of the lithium primary battery.

As described above, the oxalate borate complex component may be contained in the non-aqueous electrolyte in the form of an acid (or anion). It is to be noted, however, that in the present specification, the concentration or mass-based amount of the oxalate borate complex component in the non-aqueous electrolyte is calculated as corresponding to the concentration or mass-based amount of the lithium salt of the oxalate borate complex.

(Cyclic Imide Component)

As the cyclic imide component, a cyclic diacylamine is exemplified. The cyclic imide component has a diacylamine ring (sometimes referred to as an imide ring). The imide ring may be condensed with another ring (sometimes referred to as a second ring). The non-aqueous electrolyte may contain one kind or two or more kinds of cyclic imide components. The cyclic imide component may be contained in the non-aqueous electrolyte in the form of an imide, or may be contained in the form of an anion or a salt. When the cyclic imide component is contained in the non-aqueous electrolyte in the imide form, it may be contained in a form having a free NH group, or may be contained in the form of a tertiary amine.

Examples of the second ring include an aromatic ring, and a saturated or unsaturated aliphatic ring. The second ring may contain at least one heteroatom. Examples of the heteroatom include oxygen atom, sulfur atom, and nitrogen atom.

Examples of the cyclic imide constituting the cyclic imide component include an aliphatic dicarboxylic acid imide, and a cyclic imide having the second ring. As the aliphatic dicarboxylic acid imide, succinimide and the like are exemplified. As the cyclic imide having the second ring, an imide of aromatic or alicyclic dicarboxylic acid and the like are exemplified. The aromatic dicarboxylic acid or the alicyclic dicarboxylic acid is exemplified by those having a carboxy group at each of two adjacent atoms constituting the ring. The cyclic imide having the second ring may be, for example, phthalimide, or a hydrogenated product of phthalimide. Examples of the hydrogenated product of phthalimide include cyclohex-3-ene-1, 2-dicarboximide, and cyclohexane-1,2-dicarboximide.

The imide ring may be a N-substituted imide ring having a substituent on the nitrogen atom of the imide. Examples of such a substituent include a hydroxy group, an alkyl group, an alkoxy group, and a halogen atom. The alkyl group is exemplified by a $C_{1-4}$ alkyl group, and may be methyl group, ethyl group, or the like. The alkoxy group is exemplified by a $C_{1-4}$ alkoxy group, and may be methoxy group, ethoxy group, or the like. Examples of the halogen atom include chlorine atom and fluorine atom.

Preferred examples of the cyclic imide component include phthalimide and a N-substituted phthalimide. The substituent on the nitrogen atom of the N-substituted phthalimide can be selected from those exemplified for the N-substituted imide ring. More preferred is a cyclic imide component containing at least phthalimide.

When the non-aqueous electrolyte satisfies the above condition (a), the mass ratio of the cyclic imide component to the oxalate borate complex component contained in the non-aqueous electrolyte is 0.02 or more and 10 or less, more preferably, 0.02 or more and 7 or less, or 0.02 or more and 5 or less. When the mass ratio is in the range above, a surface film having excellent lithium ion conductivity is more likely to be formed on the surface of the positive electrode. It is therefore possible to significantly suppress the reduction in capacity after storage, while suppressing the gas generation during storage of the lithium primary battery.

The concentration of the cyclic imide component in the non-aqueous electrolyte is 1 mass % or less, and may be 0.7 mass % or less. When the concentration of the cyclic imide component is in the range above, the reduction in capacity after storage of the lithium primary battery can be further suppressed. The concentration of the cyclic imide component in the non-aqueous electrolyte may be any value equal to or higher than the detection limit, and may be 0.1% by mass or more.

During storage or discharge of the lithium primary battery, the cyclic imide component is consumed for the surface film formation and the like in the lithium primary battery, and the concentration of the cyclic imide component in the non-aqueous electrolyte fluctuates. The concentration of the cyclic imide component in the non-aqueous electrolyte used for fabrication or manufacturing of the lithium primary battery is preferably set to 0.1 mass % or more. In this case, the gas generation during storage of the lithium primary battery can be effectively suppressed. The concentration of the cyclic imide component in the non-aqueous electrolyte used for fabrication or manufacturing of the lithium primary battery is preferably set to 1 mass % or less, more preferably 0.7 mass % or less. In this case, the reduction in capacity after storage of the lithium primary battery can be significantly suppressed.

When the non-aqueous electrolyte satisfies the above condition (b), the concentration of the cyclic imide component in the non-aqueous electrolyte is 0.1 mass % or more and 1 mass % or less, and may be 0.1 mass % or more and 0.7 mass % or less. When the concentration of the cyclic imide component is in the range above, it is possible to significantly suppress the reduction in capacity after storage, while suppressing the gas generation during storage of the lithium primary battery.

The mass ratio of the cyclic imide component to the oxalate borate complex component contained in the non-aqueous electrolyte may be 0.02 or more and 10 or less, and may be 0.02 or more and 7 or less, or 0.02 or more and 5 or less. When the mass ratio is in the range above, it is possible to further suppress the reduction in capacity after storage, while more effectively suppressing the gas generation during storage of the lithium primary battery.

As described above, the cyclic imide component may be contained in the non-aqueous electrolyte in the form of a salt. It is to be noted, however, in the present specification, the concentration or mass-based amount of the cyclic imide component in the non-aqueous electrolyte is calculated as corresponding to the concentration or mass-based amount of the cyclic imide having a free NH group.

(Non-Aqueous Solvent)

The non-aqueous solvent may be a typical organic solvent used in a non-aqueous electrolyte of a lithium primary battery. Examples of the non-aqueous solvent include an ether, an ester, and a carbonic acid ester. Specific examples of the non-aqueous solvent include dimethyl ether, γ-butyl lactone, propylene carbonate, ethylene carbonate, and 1,2-dimethoxyethane. The non-aqueous electrolyte may contain one kind or two or more kinds of non-aqueous solvents.

In view of improving discharge characteristics of the lithium primary battery, the non-aqueous solvent preferably contains a cyclic carbonic acid ester, which has a high boiling point, and a chain ether, which has a low viscosity even under low temperatures. The cyclic carbonic acid ester preferably includes at least one selected from the group consisting of propylene carbonate (PC) and ethylene carbonate (EC), of which PC is particularly preferred. The chain ether preferably has a viscosity of 1 mPa's or less, at 25° C., and particularly preferably includes dimethoxyethane (DME). The viscosity of the non-aqueous solvent can be measured using a small sample viscometer m-VROC available from RheoSense, Inc., in a 25° C. environment, at a shear rate of 10,000 (1/s).

(Lithium Salt)

The non-aqueous electrolyte may contain a lithium salt other than the oxalate borate complex component and the cyclic imide component. The lithium salt may be, for example, a lithium salt used as a solute in a lithium primary battery. Examples of such a lithium salt include $LiCF_3SO_3$, $LiClO_4$, $LiBF_4$, $LiPF_6$, $LiRaSO_3$ (Ra is a fluoroalkyl group having 1 to 4 carbon atoms), $LiFSO_3$, $LiN(SO_2Rb)(SO_2Rc)$ (Rb and Rc are independently a fluoroalkyl group having 1 to 4 carbon atoms), $LiN(FSO_2)_2$, and $LiPO_2F_2$. The non-aqueous electrolyte may contain one kind or two or more kinds of these lithium salts.

(Others)

The concentration of lithium ions (total lithium salt concentration) in the non-aqueous electrolyte is, for example, 0.2 to 2.0 mol/L, and may be 0.3 to 1.5 mol/L.

The non-aqueous electrolyte may contain an additive, if necessary. Examples of the additive include propane sultone and vinylene carbonate. The total concentration of the additive in the non-aqueous electrolyte is, for example, 0.003 to 5 mol/L.

The non-aqueous electrolyte preferably does not contain a silyl ester in which at least one of the acidic protons of an acid containing phosphorus or boron is substituted by a silyl group having three hydrocarbon groups. A lithium primary battery, unlike a secondary battery, does not undergo a process in which the positive electrode is oxidized by charging, to be high potential. Therefore, when the non-aqueous electrolyte contains such a silyl ester, a surface film containing a component derived from the silyl ester is hardly formed on the positive electrode, but on the other hand, reductive decomposition occurs on the negative electrode, causing gas generation and the like, which leads to a reduction in reliability of the lithium primary battery in some cases.

(Separator)

The lithium primary battery usually includes a separator interposed between the positive electrode and the negative electrode. The separator may be a porous sheet formed of an electrically insulating material having resistance against the internal environment of the lithium primary battery. Specific examples thereof include a nonwoven fabric made of synthetic resin, a microporous film made of synthetic resin, and a laminate of these.

Examples of the synthetic resin used for the nonwoven fabric include polypropylene, polyphenylene sulfide, and polybutylene terephthalate. Examples of the synthetic resin used for the microporous film include a polyolefin resin, such as polyethylene, polypropylene, and ethylene-propylene copolymer. The microporous film may contain inorganic particles, if necessary.

The thickness of the separator is, for example, 5 μm or more and 100 μm or less.

The structure of the lithium primary battery is not limited. The lithium primary battery may be a coin-type battery including a laminated electrode group formed by laminating a disc-shaped positive electrode to a disc-shaped negative electrode with a separator interposed therebetween. It may be a cylindrical-type battery including a wound electrode group formed by spirally winging a belt-like positive electrode and a belt-like negative electrode with a separator interposed therebetween.

FIG. 1 is a front view, partially in section, of a lithium primary battery according to one embodiment of the present disclosure. In a lithium primary battery 10, an electrode group formed by winding a positive electrode 1 and a negative electrode 2 with a separator 3 therebetween is housed, together with a non-aqueous electrolyte, in a battery case 9. A sealing plate 8 is attached at the opening of the battery case 9. A positive electrode lead 4 connected to a current collector 1*a* of the positive electrode 1 is connected to the sealing plate 8. A negative electrode lead 5 connected to the negative electrode 2 is connected to the case 9. On the upper and lower sides of the electrode group, an upper insulating plate 6 and a lower insulating plate 7 are respectively disposed, in order to prevent an internal short circuit.

[Method of Manufacturing Lithium Primary Battery]

The lithium primary battery can be manufactured by housing the positive electrode, the negative electrode, and the non-aqueous electrolyte in the battery case. The method for manufacturing a lithium primary battery of the present disclosure includes at least a step of preparing a non-aqueous electrolyte containing an oxalate borate complex component and a cyclic imide component and satisfying the above condition (b). In the lithium primary battery obtained by the manufacturing method including such a step, it is possible to significantly suppress the reduction in capacity after storage, while suppressing the gas generation during storage. In the manufacturing method of the lithium primary battery, any known manufacturing steps can be adopted depending on the type and like of battery, except for the step of preparing the non-aqueous electrolyte.

EXAMPLE

The present disclosure will be specifically described below based on Examples and Comparative Examples, but the present disclosure is not limited to the following Examples.

Examples 1 to 7 and Comparative Examples 1 to 7

(1) Production of Positive Electrode

To produce a positive electrode, first, to 100 parts by mass of electrolytic manganese dioxide, 5 parts by mass of Ketjen black serving as a conductive agent, 5 parts by mass of polytetrafluoroethylene serving as a binder, and an appropriate amount of pure water were added and kneaded, to prepare a positive electrode material mixture in a wet state.

Next, the positive electrode material mixture was packed onto a positive electrode current collector formed of a 0.1-mm-thick expanded metal made of stainless steel (SUS444), to prepare a positive electrode precursor. Thereafter, the positive electrode precursor was dried and rolled with a roll press until the thickness reached 0.4 mm, and then, cut into a sheet of 2.2 cm long and 1.5 cm wide, to obtain a positive electrode. Subsequently, part of the packed positive electrode material mixture was peeled off, and a tab lead made of SUS444 was resistance welded to the exposed portion of the positive electrode current collector.

(2) Production of Negative Electrode

A metal lithium foil having a thickness of 300 μm was cut into a size of 4 cm long and 2.5 cm wide, to obtain a negative electrode. A nickel tab lead was connected to the negative electrode at a predetermined position by pressure welding.

(3) Formation of Electrode Group

A separator was placed on the positive electrode and wound together with the negative electrode such that the separator faces the negative electrode, to form an electrode group. The separator used here was a 25-μm-thick polypropylene microporous film.

(4) Preparation of Non-Aqueous Electrolyte

PC, EC and DME were mixed in a volume ratio of 4:2:4. To the resultant mixture, $LiCF_3SO_3$ was dissolved at a concentration of 0.5 mol/L, and an oxalate borate complex component shown in Table 1 and phthalimide as a cyclic imide component were added, each at a concentration shown in Table 1. In this way, a non-aqueous electrolyte was prepared. As the oxalate borate complex component, LiBOB or lithium difluoro(oxalate)borate ($LiB(C_2O_4)F_2$ (LiFOB)) was used.

(5) Fabrication of Lithium Primary Battery

The electrode group was housed in a tubular aluminum laminated bag of 9 cm long and 6 cm wide, with part of each of the tab leads connected to the positive electrode and the negative electrode exposed from the bag, and the opening on the tab lead side was sealed. Then, 0.5 mL of the electrolyte was injected through the opening on the side opposite to the tab lead, and the opening was sealed by vacuum heat sealing. In this way, a lithium primary battery for testing was produced. The design capacity of the lithium primary battery was set to 301 mAh/g.

In the lithium primary battery of Examples, the amount of sulfur atoms derived from the sulfate contained in the positive electrode material mixture was 0.05 parts by mass or more and 1.25 parts by mass or less, relative to 100 parts by mass of manganese atoms contained in the positive electrode material mixture. In the lithium primary battery of Examples, the median particle diameter of $Li_xMnO_2$ contained in the positive electrode was 25 μm to 27 μm, and the BET specific surface area thereof was 38 to 42 $m^2/g$.

(6) Evaluation (6-1) Reduction in Capacity after Storage

The lithium primary battery immediately after fabrication was discharged by a capacity equivalent to 2.5% of the design capacity (C0), and then stored at 60° C. for 3 days. The lithium primary battery after storage was discharged at a current of 4.5 mA per unit mass (g) of manganese dioxide, until the battery voltage reached 2 V. The discharge capacity C1 (mAh/g) at this time was determined. By subtracting C0 from C1, the amount of reduction in capacity was determined. The ratio (%) of the amount of reduction in capacity in each lithium primary battery to that of the lithium primary battery of Comparative Example 7, which was taken as 100%, was determined as a capacity reduction ratio after storage. A lower capacity reduction ratio indicates that the reduction in capacity has been more suppressed.

(6-2) Gas Generation

The lithium primary battery immediately after fabrication was discharged by a capacity equivalent to 2.5% of the design capacity, and then stored at 85° C. for 2 weeks. The lithium primary battery after storage was disassembled, to collect the gas contained in the battery. The collected gas was analyzed by gas chromatography, to determine the amount of $H_2$, CO, $CO_2$, and $CH_4$ gases. The ratio (%) of the gas amount by volume in each lithium primary battery to that in the lithium primary battery of Comparative Example 7, which was taken as 100%, was determined. A smaller ratio indicates that the gas generation has been more suppressed.

Table 1 shows the results of Examples and Comparative Examples. In Table 1, E1 to E7 represent Examples 1 to 7, and R1 to R7 represent Comparative Examples 1 to 7. In Table 1, the oxalate borate complex component is denoted as the first component, and the cyclic imide component is denoted as the second component.

TABLE 1

| | First component | | Second component | Ratio by mass (Second | Capacity reduction | Gas |
|---|---|---|---|---|---|---|
| | Kind | Concentration (mass %) | Concentration (mass %) | component/ First component) | ratio (%) | generation (%) |
| E1 | LiBOB | 1 | 0.5 | 0.5 | 11 | 85 |
| E2 | LIFOB | 1 | 0.5 | 0.5 | 57 | 77 |
| E3 | LiBOB | 0.1 | 0.5 | 5 | 87 | 76 |
| E4 | LiBOB | 0.5 | 0.5 | 1 | 33 | 94 |
| E5 | LiBOB | 5 | 0.5 | 0.1 | 10 | 20 |
| E6 | LiBOB | 5 | 0.1 | 0.02 | 23 | 23 |
| E7 | LiBOB | 5 | 0.7 | 0.14 | 48 | 17 |
| R1 | LiBOB | 1 | 0 | — | 71 | 106 |
| R2 | LiBOB | 1 | 0.01 | 0.01 | 75 | 107 |
| R3 | LiBOB | 1 | 1.5 | 1.5 | 156 | 74 |
| R4 | LiBOB | 0.01 | 0.5 | 50 | 178 | 82 |
| R5 | LiBOB | 7 | 0.5 | 0.07 | 25 | 135 |
| R6 | — | 0 | 0.5 | — | 200 | 75 |
| R7 | — | 0 | 0 | — | 100 | 100 |

As shown in Table 1, when the non-aqueous electrolyte did not contain the second component and contained the first component, the gas generation increased by 6%, as compared to when the non-aqueous electrolyte contained neither the first component nor the second component (comparison of Comparative Example 1 to Comparative Example 7). This indicates that this gas generation is due to the decomposition of the first component. On the other hand, when the non-aqueous electrolyte contained the second component in addition to the first component, the gas generation during storage of the lithium primary battery was suppressed (comparison of Comparative Example 7 to Examples 1 to 7).

When the non-aqueous electrolyte did not contain the first component and contained the second component, the capacity was considerably reduced as compared to when the non-aqueous electrolyte contained neither the first component nor the second component, and the capacity reduction ratio after storage was as high as 200% (comparison of Comparative Example 6 to Comparative Example 7). When the non-aqueous electrolyte did not contain the second component and contained the first component, the capacity reduction ratio after storage was 71%, which was an improvement by 29%, as compared to when the non-aqueous electrolyte contained neither the first component nor the second component (comparison of Comparative Example 1 to Comparative Example 7). From these results, it can be predicted that when the non-aqueous electrolyte contains both the first component and the second component, the capacity reduction ratio after storage would be 200%−29%=171%. However, in reality, when the non-aqueous electrolyte contained both the first component and the second component, the capacity reduction ratio after storage was 11%, which was significantly lower than the predicted value of 171% (Example 1). Such effects are considered to be clearly due to the synergistic effect of the first component and the second component.

The above effects of Examples can be obtained when the non-aqueous electrolyte satisfies at least one of the aforementioned conditions (a) and (b) (comparison of Examples 1 to 7 to Comparative Examples 2 to 5).

INDUSTRIAL APPLICABILITY

The lithium primary battery of the present disclosure can suppress the reduction in capacity and gas generation associated with storage. Therefore, the lithium primary battery can be suitably used, for example, as a main power source for various meters and a memory backup power source. The applications of the lithium primary battery, however, are not limited thereto.

REFERENCE SIGNS LIST

1 positive electrode
la positive electrode current collector
2 negative electrode
3 separator
4 positive electrode lead
5 negative electrode lead
6 upper insulating plate
7 lower insulating plate
8 sealing plate
9 battery case
10 lithium primary battery

The invention claimed is:

1. A lithium primary battery, comprising: a positive electrode; a negative electrode; and a non-aqueous electrolyte, wherein the positive electrode contains a positive electrode material mixture including $Li_xMnO_2$ where $0 \leq x \leq 0.05$, the negative electrode contains at least one selected from the group consisting of metal lithium and a lithium alloy, the non-aqueous electrolyte contains an oxalate borate complex component and a cyclic imide component, the oxalate borate complex component includes at least one selected from the group consisting of a bis(oxalate) borate complex component and a difluoro(oxalate) borate complex component, the cyclic imide component includes at least one selected from the group consisting of phthalimide and a N-substituted phthalimide, a concentration of the oxalate borate complex component in the non-aqueous electrolyte is 0.1 mass % or more and 5.5 mass % or less, a concentration of the cyclic imide component in the non-aqueous electrolyte is 0.1 mass % or more and 1 mass % or less, and wherein the oxalate borate complex component includes at least one selected from the group consisting of lithium bis(oxalate)borate and lithium difluoro(oxalate)borate.

2. The lithium primary battery according to claim 1, wherein a mass ratio of the cyclic imide component to the oxalate borate complex component contained in the non-aqueous electrolyte is 0.02 or more and 10 or less.

3. The lithium primary battery according to claim 1, wherein the cyclic imide component includes at least phthalimide.

4. The lithium primary battery according to claim 1, wherein the positive electrode material mixture further includes a manganese sulfate, and the positive electrode material mixture contains sulfur atoms in an amount of 0.05 parts by mass or more and 3 parts by mass or less, relative to 100 parts by mass of manganese atoms contained in the positive electrode material mixture.

5. The lithium primary battery according to claim 1, wherein a median particle diameter of $Li_xMnO_2$ is 10 μm or more and 40 μm or less.

6. The lithium primary battery according to claim 1, wherein a BET specific surface area of $Li_xMnO_2$ is 20 $m^2/g$ or more and 50 $m^2/g$ or less.

7. The lithium primary battery according to claim 1, wherein the negative electrode includes a metal lithium foil or a lithium alloy foil having a shape having a longitudinal direction and a lateral direction, and a continuous tape including a resin base material and an adhesive layer is attached on at least one principal surface of the negative electrode along the longitudinal direction.

8. A non-aqueous electrolyte, comprising:

an oxalate borate complex component and a cyclic imide component, wherein the oxalate borate complex component includes at least one selected from the group consisting of a bis(oxalate) borate complex component and a difluoro(oxalate) borate complex component, the cyclic imide component includes at least one selected from the group consisting of phthalimide and a N-substituted phthalimide, a concentration of the oxalate borate complex component in the non-aqueous electrolyte is 0.1 mass % or more and 5.5 mass % or less, a concentration of the cyclic imide component in the non-aqueous electrolyte is 0.1 mass % or more and 1 mass % or less, and wherein the oxalate borate complex component includes at least one selected from the group consisting of lithium bis(oxalate)borate and lithium difluoro(oxalate)borate.

* * * * *